(12) United States Patent
Wang et al.

(10) Patent No.: US 10,165,281 B2
(45) Date of Patent: Dec. 25, 2018

(54) METHOD AND SYSTEM FOR OBJECTIVE PERCEPTUAL VIDEO QUALITY ASSESSMENT

(71) Applicants: Zhou Wang, Waterloo (CA); Abdul Rehman, Kitchener (CA); Kai Zeng, North York (CA)

(72) Inventors: Zhou Wang, Waterloo (CA); Abdul Rehman, Kitchener (CA); Kai Zeng, North York (CA)

(73) Assignee: SSIMWAVE INC., Waterloo (CA)

( * ) Notice: Subject to any disclaimer, the term of this patent is extended or adjusted under 35 U.S.C. 154(b) by 219 days.

(21) Appl. No.: 14/916,927

(22) PCT Filed: Sep. 5, 2014

(86) PCT No.: PCT/CA2014/000676
§ 371 (c)(1),
(2) Date: Mar. 4, 2016

(87) PCT Pub. No.: WO2015/031982
PCT Pub. Date: Mar. 12, 2015

(65) Prior Publication Data
US 2016/0212432 A1      Jul. 21, 2016

Related U.S. Application Data

(60) Provisional application No. 61/959,947, filed on Sep. 6, 2013.

(51) Int. Cl.
*H04N 7/12*        (2006.01)
*H04N 19/154*      (2014.01)
(Continued)

(52) U.S. Cl.
CPC .......... *H04N 19/154* (2014.11); *G06K 9/036* (2013.01); *G06T 7/0002* (2013.01);
(Continued)

(58) Field of Classification Search
CPC .... H04N 19/154; H04N 19/53; H04N 17/004; G06K 9/036; G06T 7/0002; G06T 2207/30168; G06T 2207/10016
(Continued)

(56) References Cited

U.S. PATENT DOCUMENTS

| | | | | |
|---|---|---|---|---|
| 2006/0233442 | A1* | 10/2006 | Lu ....................... | G06K 9/00711 382/190 |
| 2011/0255589 | A1* | 10/2011 | Saunders ............. | H04N 19/176 375/240.01 |
| 2012/0044990 | A1* | 2/2012 | Bivolarsky .......... | H04N 19/105 375/240.03 |

FOREIGN PATENT DOCUMENTS

CA      2604139 C   * 11/2007   ........... H04N 17/004

\* cited by examiner

*Primary Examiner* — Allen C Wong
(74) *Attorney, Agent, or Firm* — Tai W. Nahm; Miller Thomson LLP

(57) ABSTRACT

There is disclosed a method and system for objective video quality assessment. The objective video quality assessment approach automatically predicts human visual quality assessment behaviors in evaluating videos that contain artifacts generated during video acquisition, storage, reproduction, compression, transmission, processing, and/or display. The present method and system computes a five-dimensional quality map of a video being assessed, where the map indicates the local quality variations of the video in a five-dimensional space, which includes two spatial dimensions, one scale dimension, one time dimension, and one distortion type dimension. The present method and system may use one or a combination of device and viewing condition parameters in the generation of the quality map, and in the combination of the quality map into a scalar or vector-values measure that indicates quality aspects of the test videos.

32 Claims, 10 Drawing Sheets

(51) Int. Cl.
*H04N 19/53* (2014.01)
*G06K 9/03* (2006.01)
*G06T 7/00* (2017.01)
*H04N 17/00* (2006.01)

(52) U.S. Cl.
CPC ........... *H04N 17/004* (2013.01); *H04N 19/53* (2014.11); *G06T 2207/10016* (2013.01); *G06T 2207/30168* (2013.01)

(58) Field of Classification Search
USPC .................................................. 375/240.26
See application file for complete search history.

METHOD AND SYSTEM FOR OBJECTIVE PERCEPTUAL VIDEO QUALITY ASSESSMENT

FIELD OF THE INVENTION

This invention relates in general to objective quality assessment of videos and more particularly to using automatic objective video quality assessment approaches to estimate and predict the quality assessment behaviours of humans who are viewing videos that contain various types of artifacts generated during the processes of video acquisition, storage, reproduction, compression, transmission, processing, and/or display.

BACKGROUND OF THE INVENTION

Over the past years, there has been an exponential increase in the demand for video services. Video data dominates Internet video traffic and is predicted to increase much faster than other media types in the years to come. Cisco predicts that video data will account for 79% of Internet traffic by 2018 and mobile video will represent two-thirds of all mobile data traffic by 2018. Well accustomed to a variety of multimedia devices, consumers want a flexible digital lifestyle in which high-quality multimedia content follows them wherever they go and on whatever device they use. This imposes significant challenges for managing video traffic efficiently to ensure an acceptable quality-of-experience (QoE) for the end user, as the perceptual quality of video content strongly depends on the properties of the display device and the viewing conditions. Network throughput based video adaptation, without considering a user's QoE, could result in poor video QoE or wastage of bandwidth. Consequently, QoE management under cost constraints is the key to satisfying consumers and video monetization services.

Digital videos are subject to a wide variety of distortions during acquisition, processing, compression, storage, transmission, reproduction, and display, any of which may result in degradation of visual quality. For applications in which videos are ultimately to be viewed by human beings, the only "correct" method of quantifying visual image quality is through subjective evaluation. In practice, however, subjective evaluation is usually too inconvenient, time-consuming and expensive. Objective video quality assessment (VQA) methods may automatically predict the quality assessment behaviours of humans viewing the video signals.

VQA methods have broad applications 1) in the evaluations and comparisons of the quality of videos and the performance of different video acquisition, processing, compression, storage, transmission, reproduction, and display methods and systems; 2) in the control, maintenance, streaming, and resource allocation of visual communication systems; and 3) in the design and optimization of video acquisition, processing, compression, storage, transmission, reproduction, and display methods and systems.

The simplest and most widely used prior art VQA measure is the mean squared error (MSE), computed by averaging the squared intensity differences of distorted and reference image pixels, along with the related quantity of peak signal-to-noise ratio (PSNR). The MSE and PSNR are simple to calculate and are mathematically convenient in the context of optimization. But they are not very well matched to perceived visual quality [1]. The most famous and representative state-of-the-art prior-art methods include the structural similarity index (SSIM) [2,3], the multi-scale structural similarity index (MS-SSIM) [4], the video quality metric (VQM) [5], and the motion-based video integrity evaluation index (MOVIE) [6]. All of them have achieved better quality prediction performance than MSE/PSNR. Among them, the best tradeoff of quality prediction performance and computational cost is obtained by SSIM and MS-SSIM [7]. Despite this, none of them considers the differences between the viewing devices of the end-users, which are an important factor of the visual quality-of-experience of the end users. For example, the human quality assessment of the same video can be significantly different when it is displayed on different viewing devices, such as HDTV, digital TV, projectors, desktop PCs, laptop PCs, tablets, and smartphones, and many more. Prior-art techniques ignore such differences and do not contain adaptive frameworks and mechanisms that can adjust themselves to the changes of viewing device parameters. Moreover, the quality analysis information provided by prior art methods is limited. For example, VQM and MOVIE do not supply spatially and temporally localized quality maps, SSIM does not produce quality maps at different scales, and SSIM and MS-SSIM do not take into account temporal distortions.

Therefore, what is needed are improvements to the methods and systems for objective perceptual video quality assessment which overcome at least some of the limitations of the prior art.

SUMMARY OF THE INVENTION

The present disclosure relates to a method and system for automatic objective quality prediction of video quality perceived by humans. One embodiment described in this specification is the "SSIMplus" method, as will be described in more detail further below.

In an embodiment, the method and system computes a five-dimensional quality map of a video being assessed, where the map reflects the local quality variations of the video in five aspects or across a five-dimensional space, which include spatial dimensions (2 dimensions: horizontal and vertical), scale or spatial frequency (1 dimension), time (1 dimension), and distortion type (1 dimension).

In another embodiment, the method and system may compute a lower dimensional quality map that includes any subset of the five dimensions described in the above paragraph. This computation may result in a 1-dimensional, 2-dimensional, 3-dimensional, or 4-dimensional quality map that resides in a subspace of the 5-dimensional space described in the above paragraph.

In another embodiment, the method and system summarizes the above 5-dimensional quality map or a subset of the 5-dimensional quality map into a scalar or vector-values measure that indicates aspects regarding the quality of the test video. For example, by pooling the whole 5-dimensional quality map, one can provide an evaluation of the overall quality of the video using one scalar index. For another example, by focusing on one time instance (1 fixed location in the time dimension), one can fuse the quality map in the other four dimensions to compute a quality evaluation for the video at one particular time instance. For yet another example, by focusing one specific distortion type (1 fixed location in the distortion type dimension), one can combine the quality map in the other four dimensions to compute a quality or distortion evaluation for the video from the view point of 1 particular distortion type.

In another embodiment, the method and system uses device and viewing condition dependent input parameters in the generation of the five-dimensional quality map.

In another embodiment, the method and system uses device and viewing condition dependent parameters in combing the 5-dimensional quality map or a subset of the 5-dimensional quality map into a scalar or vector-values measure that indicates aspects regarding the quality of the test video.

In another embodiment, the method and system uses one or a combination of the following device and viewing parameters in the generation of the five-dimensional quality map: 1) average or range of user viewing distance, 2) sizes of viewing window and screen; 3) screen resolution; 4) screen contrast; 5) replay temporal resolution; 6) illumination condition of the viewing environment; 7) viewing angle; 8) viewing window resolution; 9) post-filtering and image resizing methods; 10) device model; 11) screen gamma correction parameter; 12) option of interleave or interlaced video mode.

In yet another aspect, the method and system uses device and viewing condition dependent parameters in combing the 5-dimensional quality map or a subset of the 5-dimensional quality map into a scalar or vector-values measure that indicates aspects regarding the quality of the test video: 1) average or range of user viewing distance, 2) sizes of viewing window and screen; 3) screen resolution; 4) screen contrast; 5) replay temporal resolution; 6) illumination condition of the viewing environment; 7) viewing angle; 8) viewing window resolution; 9) post-filtering and image resizing methods; 10) device model; 11) screen gamma correction parameter; 12) option of interleave or interlaced video mode.

It is to be understood that the invention is not limited in its application to the details of construction and to the arrangements of the components set forth in the description or the examples provided therein, or illustrated in the drawing. The invention is capable of other embodiments and of being practiced and carried out in various ways. Also, it is to be understood that the phraseology and terminology employed herein are for the purpose of description and should not be regarded as limiting.

Figure 1:
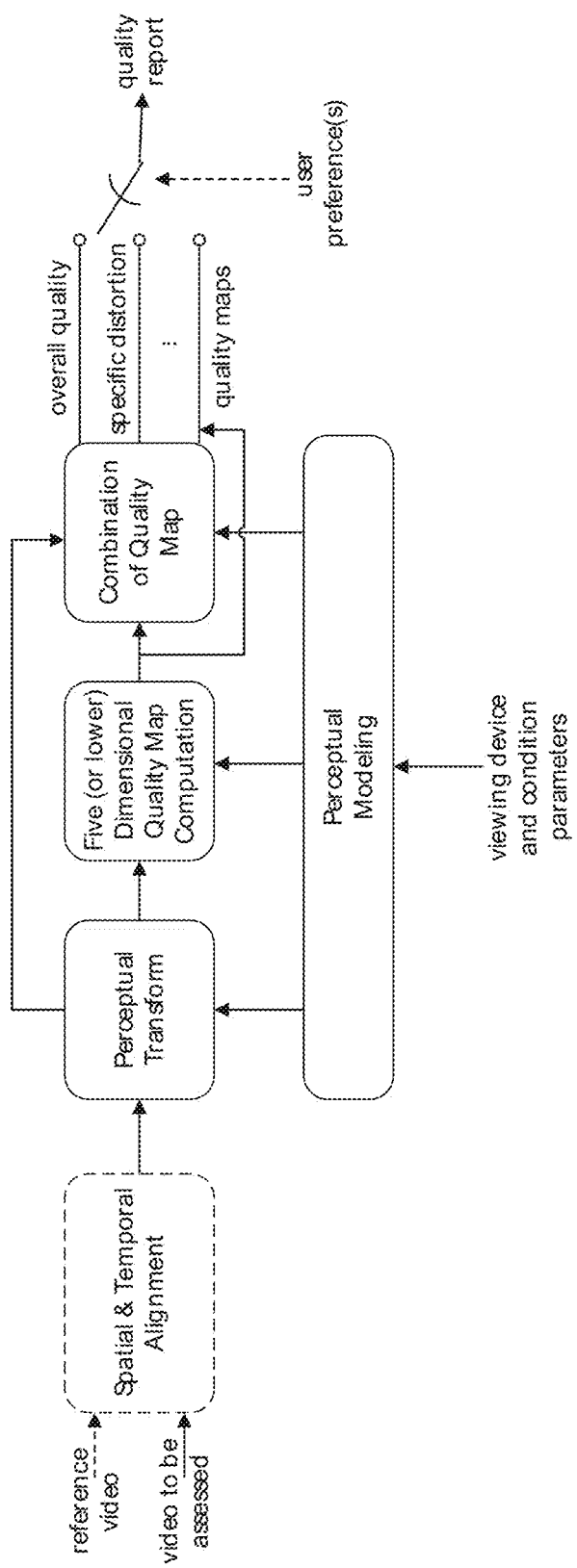
FIG. 1 shows an illustrative architecture of a system in accordance with an embodiment.

In the drawings, various embodiments are illustrated by way of example. It is to be expressly understood that the description and drawings are only for the purpose of illustration and as an aid to understanding, and are not intended as a definition of the limits of the invention.

DETAILED DESCRIPTION

As noted above, the present disclosure relates to a system, method and computer program product for objective, perceptual video quality assessment.

In one aspect, the system and method employs advanced computational models to analyze the perceptual quality of video content based on the understanding of the human visual system obtained through psychophysical studies.

In an embodiment, the system and method models the human visual system and makes no assumptions about the type or severity of degradation in the video signal to be assessed. Therefore, the method and system is very reliable as it can also handle scenarios when an 'unknown' or new distortion degrades the quality of video content. In addition to the overall quality of the video content, the method and system also provides the perceptual quality level at every pixel location.

In one embodiment, the input video signals to the system include a sample video for which quality is to be assessed, and may or may not include a reference video that is assumed to be distortion-free or having pristine quality. The input video signals may or may not match in terms of spatial resolution and frame rate. Therefore, the video signals are pre-processed to make sure that the downstream processing blocks receive spatially and temporally aligned video signals. Subsequently, the video signals undergo a perceptual transform.

In one embodiment, the transform may be a multi-scale, 2D (spatial) or 3D (spatiotemporal) wavelet-type of transform motivated by perceptual signal decomposition of the human visual system.

In another embodiment, the perceptual model is applied in the transform domain to create a multi-dimensional quality map that indicates the local quality of the video being assessed localized in space, scale, time, and/or distortion types.

In another embodiment, the quality map have five dimensions, including 2 spatial dimension, 1 scale dimension, 1 time dimension and 1 distortion type dimension. In addition, the device and viewing condition parameters may also be available.

In another embodiment, the quality map have four dimensions, including 2 spatial dimension, 1 scale dimension, and 1 time dimension, and all distortions are merged into an integrated evaluation.

In yet another embodiment, the quality map have three dimensions, including 2 spatial dimension and 1 time dimension, and all scales and all distortions are merged into an integrated evaluation.

In another embodiment, the multi-dimensional quality map is combined based on perceptual modeling as well as viewing device and viewing condition parameters to produce several layers of quality reports of the video being assessed, including a signal overall quality score of the video sequence, the quality score in terms one or multiple specific distortion types, the quality scores of each or any specific time instances, and the quality maps of particular distortion types, of specific time instances, or at specific scales.

In yet another embodiment, the computational models consider the display device and viewing conditions as input before combining the multi-dimensional quality map and predicting the perceptual quality of a video.

In another embodiment, the format of the final quality report of the video being assessed is determined by user requirement.

Figure 2:
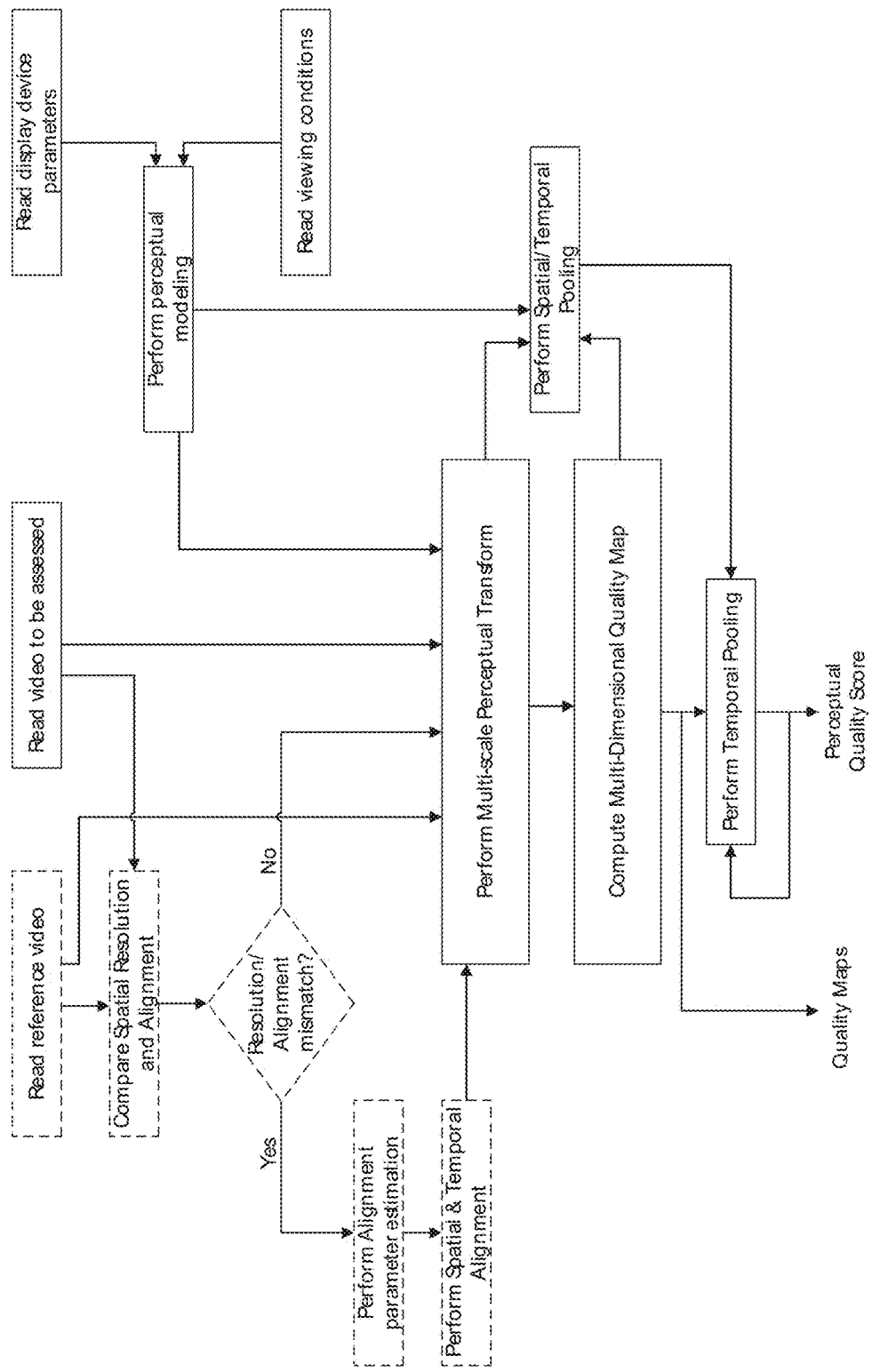
FIG. 2 shows a schematic flow-chart of a method in accordance with an embodiment.

FIG. 2 shows the flow chart of an illustrative method in accordance with an embodiment. The first step is to determine the need for spatial and temporal alignment of input video signals, and to perform such alignment if required. Temporal alignment is performed by finding the best matching frame in the reference video compared to the current frame in the distorted video. The process of finding the best matching frame along the temporal direction requires the frames being matched to be spatially aligned. In one embodiment, the spatial alignment is performed by resampling the reference frame according to the resolution of the distorted frame followed by optical flow, where the process of optical flow is used to determine the spatial shift.

In one embodiment, once the input video signals are spatially and temporally aligned, a multi-scale transform of reference and distorted video frames is performed using a multi-resolution transform that decomposes a video frame into multiple scales, each associated with a different spatial frequency range. Subsequently, the quality maps of each scale are computed based on a structure comparison between subsequent reference and distorted scales. Afterwards, the quality of all the scales is determined by performing spatial pooling of the quality maps based on the local information content and distortion. The perceptual quality of the distorted frame is calculated using a weighted combination of the scale-wise quality values. The weights are determined using a method that takes into account the properties of the display device and viewing conditions. The perceptual quality of video content depends on the sampling density of the signal, the viewing conditions, the display device, and the perceptual capability of the observer's visual system. In practice, the subjective evaluation of a given video varies when these factors vary. The contrast perception capability of human visual system depends strongly on the spatial or spatiotemporal frequency of a visual signal, which is modeled using a function called the contrast sensitivity function (CSF). In one of the embodiments, the method and system uses one or a combination of the following device and viewing parameters to determine the contrast sensitivity of the human visual system: 1) average or range of user viewing distance, 2) sizes of viewing window and screen; 3) screen resolution; 4) screen contrast; 5) replay temporal resolution; 6) illumination condition of the viewing environment; 7) viewing angle; 8) viewing window resolution; 9) post-filtering and image resizing methods; 10) device model; 11) screen gamma correction parameter; 12) option of interleave or interlaced video mode. These parameters are used to determine the sensitivity of the human visual system to the individual scales of the input video signals. Subsequently, the sensitivity values are normalized to determine the weight/importance of the scales.

Figure 3:
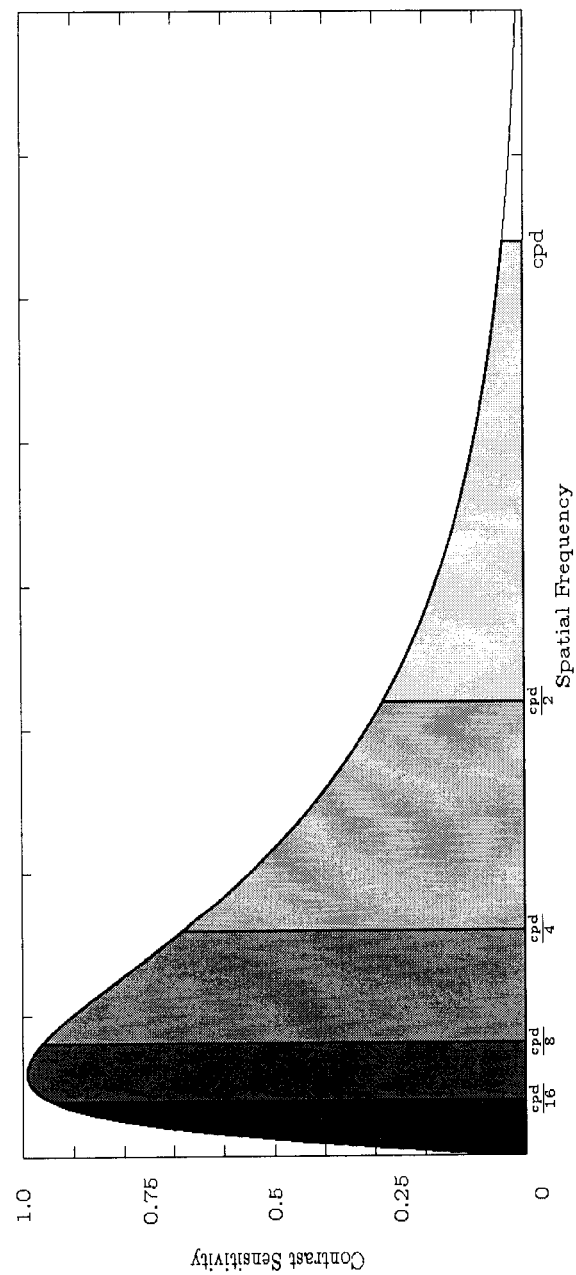
FIG. 3 provides a graph of details of device and viewing condition-dependent parameters based multi-scale weights calculation scheme in accordance with an embodiment.
Figure 4:
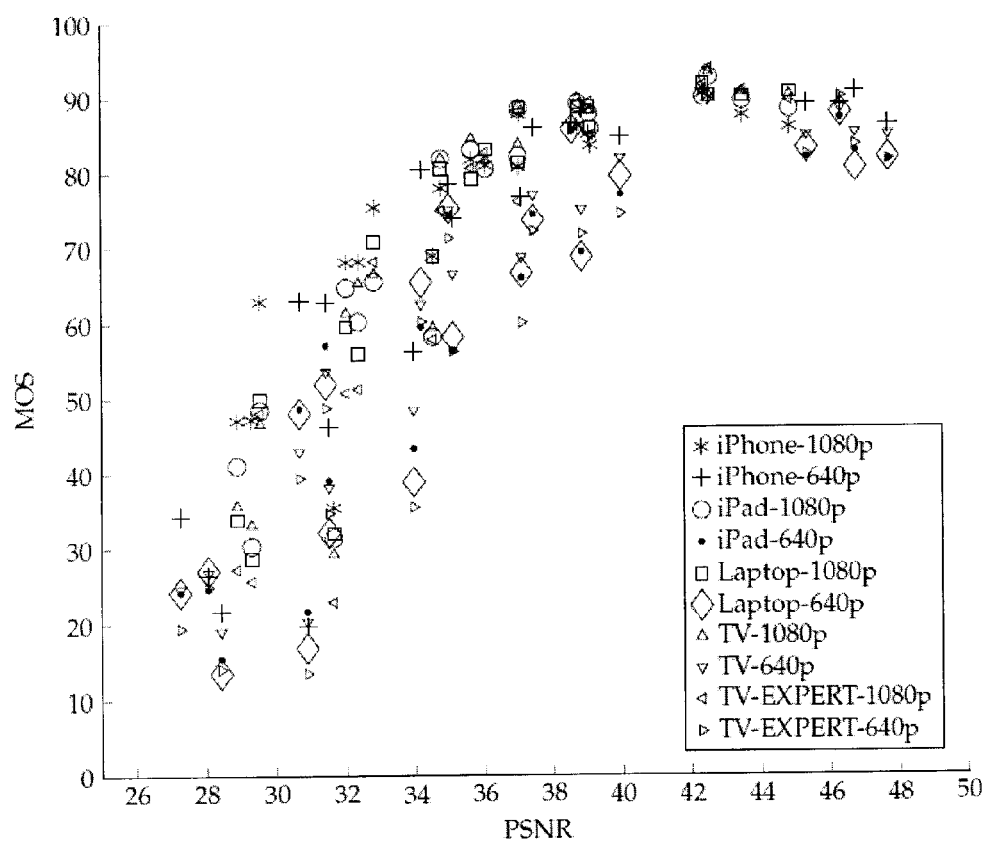
FIG. 4 plots the performance of PSNR measure when used to measure video quality of experience across various popular devices.
Figure 5:
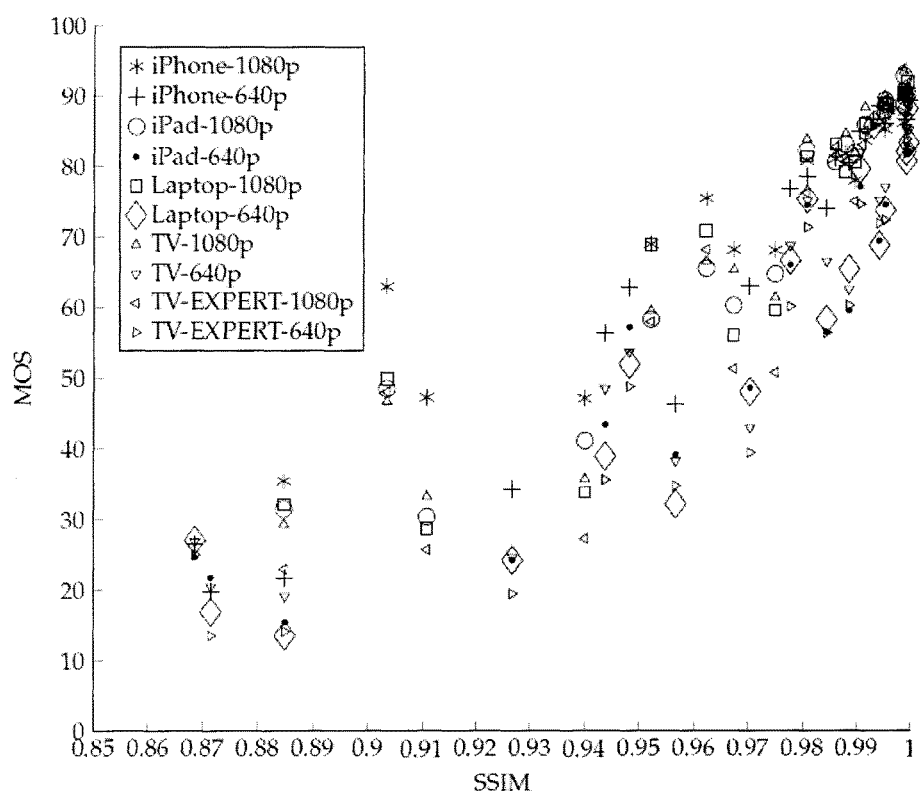
FIG. 5 plots the performance of SSIM measure when used to measure video quality of experience across various popular devices.
Figure 6:
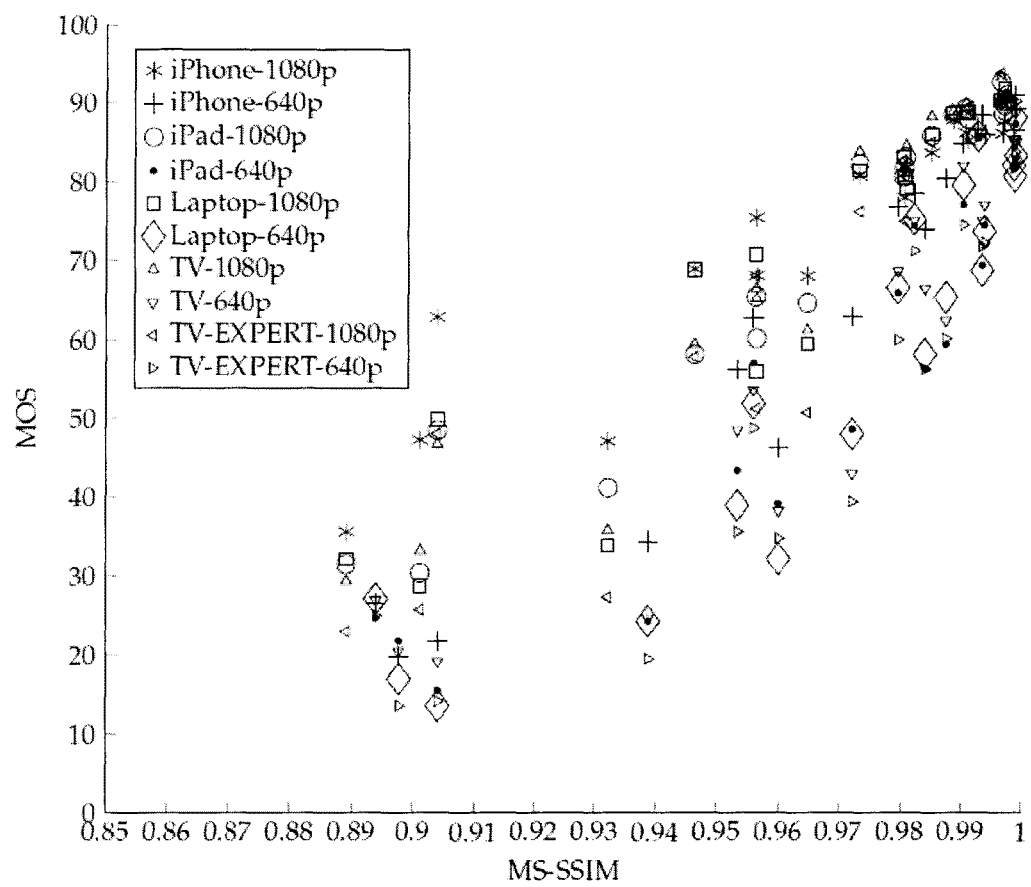
FIG. 6 plots the performance of MS-SSIM measure when used to measure video quality of experience across various popular devices.
Figure 7:
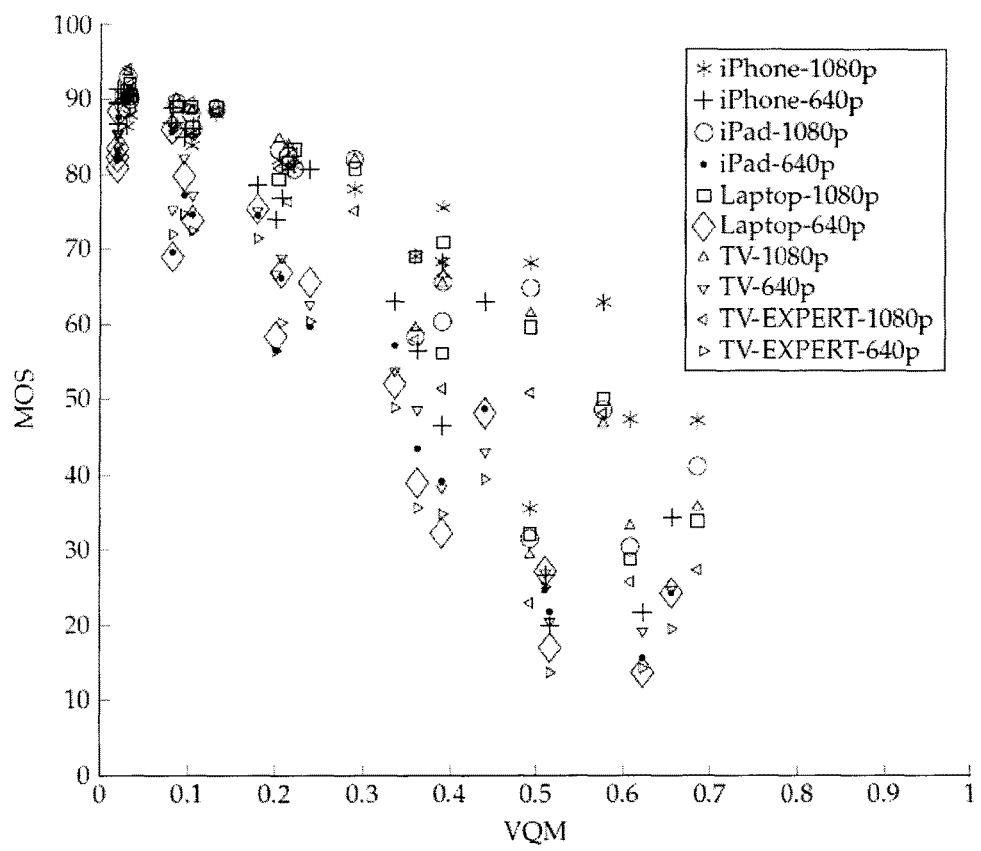
FIG. 7 plots the performance of VQM measure when used to measure video quality of experience across various popular devices.
Figure 8:
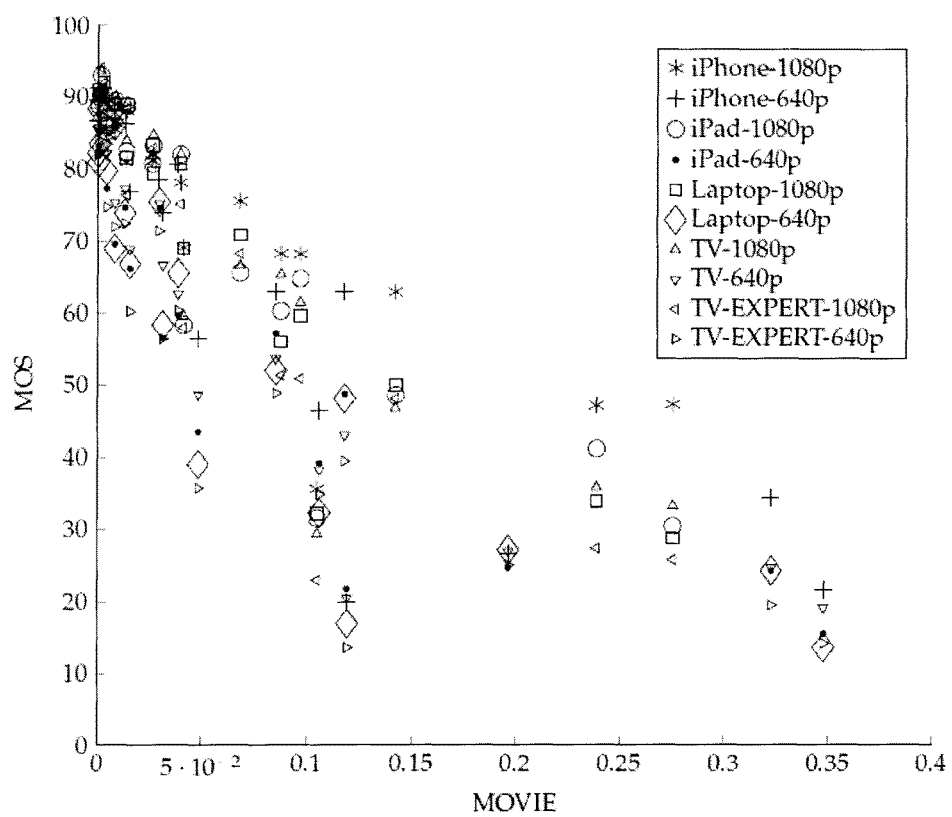
FIG. 8 plots the performance of MOVIE measure when used to measure video quality of experience across various popular devices.
Figure 9:
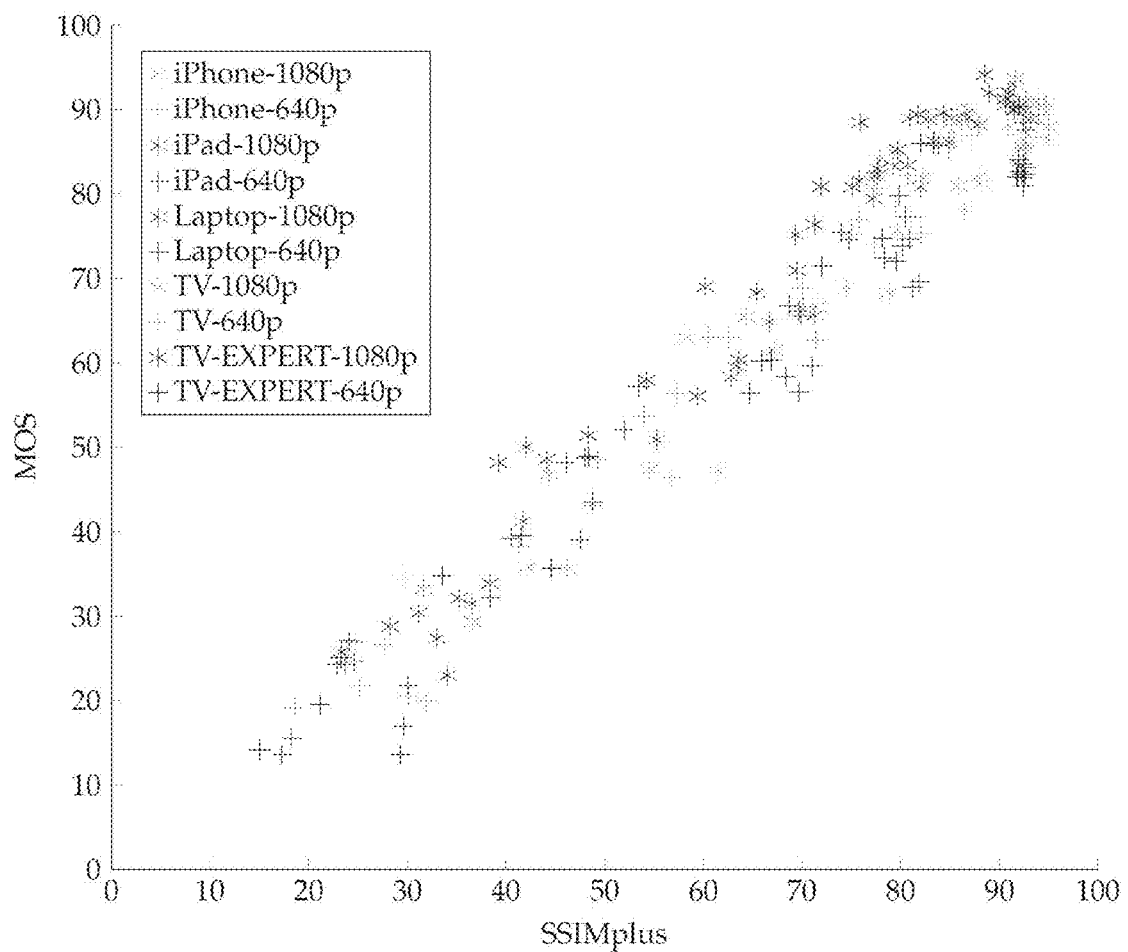
FIG. 9 plots the performance of SSIMplus, in accordance with one embodiment, which is used to measure video quality of experience across various popular devices.

In one embodiment, the parameters or a subset of the parameters of viewing window/screen size, device screen resolution, replay temporal resolution, viewing distance, device screen contrast, viewing angle, and viewing window resolution, are converted into a viewing resolution factor in the unit of the number of pixels per degree of visual angle. These parameters are also used to compute the CSF of the human visual system. The viewing resolution factor is subsequently used to determine the frequency covering range of each scale in the multi-resolution transform. The frequency covering ranges of all scales in the multi-resolution transform divide the full CSF into multiple regions, each corresponds to one scale. A weighting factor of each scale is then determined either by the height of the CSF function sampled at the center (or weight center) of the frequency covering range, or by the area under the CSF function within the frequency covering range of that scale. Since the viewing resolution factor and the CSF computation depend on device parameters and viewing conditions, the frequency covering ranges and subsequently the weighting factor of each scale are also device and viewing condition-dependent, which is an important factor that differentiates the current invention from prior art approaches. These device and viewing condition-dependent parameters are used to determine the importance of each scale in the overall quality evaluation of the image or video signal. FIG. 3 shows an example of the details of device and viewing condition-dependent parameters based multi-scale weights calculation scheme in an embodiment. In FIG. 3, cpd represent cycles per degree of visual angle which is determined by the viewing resolution factor. The frequency covering ranges of the scales in the multi-resolution transform, starting from the finest scale, are between cpd/2 and cpd, cpd/4 and cpd/2, cpd/8 and cpd/4, . . . , respectively. The integrals of the CSF curve under the respective frequency covering range are used to determine the weighting factor and thus the visual importance of the corresponding scale.

In an embodiment, the present system and method automates real-time, accurate, and easy-to-use video QoE evaluation for quality monitoring, tracking, assurance, auditing, and control. The method provides straightforward predictions on what an average consumer would say about the quality of delivered video content on a scale of 0-100 and categorizes the quality as bad, poor, fair, good, or excellent. Video QoE measurement is a computationally demanding task as the models that perform reasonably well are considerably slow and cannot be employed to perform real-time video QoE measurement. The present method and system provides an optimized monitor that performs QoE of a video signals, up to 4 k resolution, in real-time.

The examples described herein are provided merely to exemplify possible embodiments. A skilled reader will recognize that other embodiments are also possible.

It will be appreciated by those skilled in the art that other variations of the embodiments described herein may also be practiced without departing from the scope of the invention. Other modifications are therefore possible. For example, the embodiments may be utilized by 3D TV, satellite imaging, medical imaging, and telemedicine devices, as well as service providers for any of these technologies.

ILLUSTRATIVE EXAMPLES OF IMPLEMENTATION AND RESULTS

A key goal of objective VQA methods is to predict subjective quality evaluation of a video. Therefore, an important test is to evaluate how well they predict subjective scores. Recently, a subjective study was conducted by JCT-VC (Joint Collaborative Team on Video Coding) members to quantify the rate-distortion gain of the HEVC codec against a similarly configured H.264/AVC codec [8]. The database is very relevant for evaluation of video quality assessment methods developed for media & entertainment industry because it contains videos distorted by most commonly used video compression standard along with the recently developed H.265 codec. This independent and challenging subjective database is used to compare the performance of the VQA methods in predicting the perceptual quality. The performance of the SSIMplus method, which is based on one embodiment of the present invention, is compared to the most popular and widely used VQA measures that include Peak Signal-to-Noise Ratio (PSNR), Structural Similarity [2] (SSIM), Multi-scale Structural Similarity [4] (MS-SSIM), MOtion-based Video Integrity Evaluation [6] (MOVIE), and Video Quality Metric [5] (VQM).

Experimental results have shown that the SSIMplus method adapts to the properties of the display devices and changes in the viewing conditions significantly better than the state-of-the-art video quality measures under comparison. Additionally, the SSIMplus method based on one embodiment of the present invention is considerably faster than the aforementioned perceptual VQA measures and fulfills the need for real-time computation of an accurate perceptual video QoE index and a detailed quality map. The performance comparison results are provided in TABLE G. The performance comparison of the proposed scheme with the most popular and widely used image quality assessment (IQA) measures that include Peak Signal-to-Noise Ratio (PSNR), Structural Similarity [2] (SSIM), Multi-scale Structural Similarity [4] (MS-SSIM), Visual Information Fidelity (VIF) [11], and Feature Similarity (FSIM) [12]. The performance comparison results using CSIQ, TID 2008, and TID 2013 databases are provided in TABLES H, I, and J, respectively. For this purpose, five evaluation metrics are employed to assess the performance of VQA measures:

Pearson linear correlation coefficient (PLCC)
Mean absolute error (MAE)
Root mean-squared (RMS)
Spearman's rank correlation coefficient (SRCC)
Kendall's rank correlation coefficient (KRCC)

Among the above metrics, PLCC, MAE and RMS are adopted to evaluate prediction accuracy [10], and SRCC and KRCC are employed to assess prediction monotonicity [10]. A better objective VQA measure should have higher PLCC, SRCC and KRCC while lower MAE and RMS values. The best results are highlighted in bold font. All of these evaluation metrics are adopted from previous VQA studies [9, 10].

As seen from the results provided in TABLE G-J that SSIMplus not only outperforms the popular IQA and VQA quality measures in terms of perceptual quality prediction accuracy but also in terms of computation time. Additionally, SSIMplus has many exclusive features not offered by any other VQA measure.

The above test results assume a single fixed viewing device, a common assumption made by existing state-of-the-art VQA models. The capability of SSIMplus is beyond the limitation of existing models. In particular, SSIMplus is designed to inherently consider the viewing conditions such as display device and viewing distance. Due to the unavailability of public subject-rated video quality assessment databases that contain subject-rated video sequences watched under varying viewing conditions, a subjective study was performed in order to test the device-adaptive capability of the SSIMplus method.

The main purpose of the study is to observe how the state-of-the-art VQA methods adapt to varying viewing conditions. A set of raw videos sequences, consisting of 1080 p and 640 p resolutions, was compressed at various distortion levels to obtain bitstreams compliant to H.264 video compression standard. The decompressed distorted video sequences were rated by subjects under the following viewing conditions:

| Display Device | Diag. Screen Size (in) | Resolution | Brightness ($cd/m^2$) | Viewing Distance (in) |
|---|---|---|---|---|
| iPhone 5S | 4" | 1136 × 640 | 556 | 10 |
| iPad Air | 9.7" | 2048 × 1536 | 421 | 16 |
| Lenovo Laptop | 15.6" | 1920 × 1080 | 280 | 20 |
| Sony TV | 55" | 1920 × 1080 | 350 | 90 |
| Sony TV | 55" | 1920 × 1080 | 350 | 40 |

The mean opinion scores (MOS) provided by subjects were used to compare the performance of SSIMplus with state-of-the-art VQA measures. The scatter plots of the VQA methods under comparison are shown in FIG. 4-FIG. 9. The superior performance of the SSIMplus method, which is based on one embodiment, compared to the other VQA methods is evident from the figures.

Comparisons between the VQA methods using PLCC, MAE, RMS, SRCC, and KRCC are provided in TABLE A-TABLE F. It can be seen from the results that SSIMplus method outperforms other state-of-the-art video quality assessment methods. The main purpose of the subjective study is to observe the adaptation behavior of the state-of-the-art VQA measures when deployed for predicting the perceptual quality of video content viewed under different viewing conditions. TABLE E compares the performance of the VQA measures when the TV viewing distance is reduced to 20 inches (referred to as expert mode). SSIMplus adapts to the changes in the viewing conditions better than the VQA methods under comparison. SSIMplus method is considerably faster than the other quality measures proposed to predict perceptual quality of video content and meets the requirements for real-time computation of perceptual video QoE and the detailed quality map.

TABLE A

| Model | Resolution | PLCC | MAE | RMS | SRCC | KRCC |
|---|---|---|---|---|---|---|
| PSNR | 640p & 1080p | 0.8974 | 6.2667 | 9.0641 | 0.9277 | 0.7633 |
| SSIM | 640p & 1080p | 0.9498 | 4.1694 | 6.4252 | 0.9604 | 0.8249 |
| MS-SSIM | 640p & 1080p | 0.9186 | 5.2874 | 8.1157 | 0.9438 | 0.7941 |
| VQM | 640p & 1080p | 0.8939 | 6.2125 | 9.2098 | 0.9324 | 0.7736 |
| MOVIE | 640p & 1080p | 0.9030 | 6.1677 | 8.8268 | 0.9318 | 0.7710 |
| SSIMplus | 640p & 1080p | 0.9781 | 3.0251 | 4.2715 | 0.9529 | 0.8275 |

TABLE B

| Model | Resolution | PLCC | MAE | RMS | SRCC | KRCC |
|---|---|---|---|---|---|---|
| PSNR | 640p & 1080p | 0.9097 | 7.7111 | 9.4030 | 0.8616 | 0.6684 |
| SSIM | 640p & 1080p | 0.9332 | 6.5561 | 8.1391 | 0.8860 | 0.7146 |
| MS-SSIM | 640p & 1080p | 0.8986 | 8.3154 | 9.9370 | 0.8364 | 0.6427 |
| VQM | 640p & 1080p | 0.8971 | 8.2887 | 10.003 | 0.8457 | 0.6479 |
| MOVIE | 640p & 1080p | 0.9114 | 7.8819 | 9.3206 | 0.8709 | 0.6812 |

TABLE B-continued

| Model | Resolution | PLCC | MAE | RMS | SRCC | KRCC |
|---|---|---|---|---|---|---|
| SSIMplus | 640p & 1080p | 0.9701 | 4.5263 | 5.4991 | 0.9131 | 0.7659 |

TABLE C

| Model | Resolution | PLCC | MAE | RMS | SRCC | KRCC |
|---|---|---|---|---|---|---|
| PSNR | 640p & 1080p | 0.9122 | 7.6379 | 9.6722 | 0.8751 | 0.6940 |
| SSIM | 640p & 1080p | 0.9216 | 7.4738 | 9.1659 | 0.8876 | 0.7146 |
| MS-SSIM | 640p & 1080p | 0.8883 | 8.5300 | 10.841 | 0.8388 | 0.6427 |
| VQM | 640p & 1080p | 0.8981 | 8.5620 | 10.383 | 0.8560 | 0.6607 |
| MOVIE | 640p & 1080p | 0.9175 | 7.5530 | 9.3934 | 0.8852 | 0.7017 |
| SSIMplus | 640p & 1080p | 0.9698 | 4.7388 | 5.7593 | 0.9227 | 0.7813 |

TABLE D

| Model | Resolution | PLCC | MAE | RMS | SRCC | KRCC |
|---|---|---|---|---|---|---|
| PSNR | 640p & 1080p | 0.9343 | 6.4934 | 8.2855 | 0.9034 | 0.7248 |
| SSIM | 640p & 1080p | 0.9438 | 6.1363 | 7.6822 | 0.9140 | 0.7505 |
| MS-SSIM | 640p & 1080p | 0.9126 | 7.3825 | 9.5003 | 0.8742 | 0.6786 |
| VQM | 640p & 1080p | 0.9242 | 7.3915 | 8.8743 | 0.8914 | 0.6992 |
| MOVIE | 640p & 1080p | 0.9345 | 6.6421 | 8.2690 | 0.9108 | 0.7377 |
| SSIMplus | 640p & 1080p | 0.9856 | 3.2147 | 3.9271 | 0.9464 | 0.8172 |

TABLE E

| Model | Resolution | PLCC | MAE | RMS | SRCC | KRCC |
|---|---|---|---|---|---|---|
| PSNR | 640p & 1080p | 0.9204 | 7.5788 | 9.7918 | 0.8891 | 0.7077 |
| SSIM | 640p & 1080p | 0.9322 | 7.5625 | 9.0674 | 0.9113 | 0.7487 |
| MS-SSIM | 640p & 1080p | 0.9019 | 8.9489 | 10.820 | 0.8709 | 0.6872 |
| VQM | 640p & 1080p | 0.9185 | 8.3203 | 9.9051 | 0.8777 | 0.6821 |
| MOVIE | 640p & 1080p | 0.9240 | 7.6532 | 9.5777 | 0.9000 | 0.7205 |
| SSIMplus | 640p & 1080p | 0.9708 | 5.1424 | 6.0055 | 0.9311 | 0.7897 |

TABLE F

| Model | PLCC | MAE | RMS | SRCC | KRCC | Computation time (normalized) |
|---|---|---|---|---|---|---|
| PSNR | 0.9062 | 7.4351 | 9.8191 | 0.8804 | 0.6886 | 1 |
| SSIM | 0.9253 | 6.9203 | 8.8069 | 0.9014 | 0.7246 | 22.65 |
| MS-SSIM | 0.8945 | 8.1969 | 10.384 | 0.8619 | 0.6605 | 48.49 |
| VQM | 0.8981 | 8.0671 | 10.214 | 0.8703 | 0.6711 | 174.53 |
| MOVIE | 0.9096 | 7.4761 | 9.6493 | 0.8892 | 0.7001 | 3440.27 |
| SSIMplus | 0.9732 | 4.3192 | 5.3451 | 0.9349 | 0.7888 | 7.83 |

TABLE G

| | PLCC | MAE | RMS | SRCC | KRCC |
|---|---|---|---|---|---|
| PSNR | 0.5408 | 1.1318 | 1.4768 | 0.5828 | 0.3987 |
| MOVIE | 0.7164 | 0.9711 | 1.2249 | 0.6897 | 0.4720 |
| VQM | 0.8302 | 0.7771 | 0.9768 | 0.8360 | 0.6243 |
| SSIM | 0.8422 | 0.8102 | 0.9467 | 0.8344 | 0.6279 |
| MS-SSIM | 0.8527 | 0.7802 | 0.9174 | 0.8409 | 0.6350 |
| SSIMplus | 0.8678 | 0.7160 | 0.8724 | 0.8745 | 0.6737 |

TABLE H

| Model | PLCC | MAE | RMS | SRCC | KRCC |
|---|---|---|---|---|---|
| PSNR | 0.7512 | 0.1366 | 0.1733 | 0.8058 | 0.6084 |
| SSIM | 0.8612 | 0.0992 | 0.1334 | 0.8756 | 0.6907 |
| MS-SSIM | 0.8991 | 0.0870 | 0.1149 | 0.9133 | 0.7393 |
| VIF | 0.9277 | 0.0743 | 0.0980 | 0.9193 | 0.7534 |
| FSIM | 0.9120 | 0.0851 | 0.1077 | 0.9242 | 0.7567 |
| SSIMplus | 0.9405 | 0.0638 | 0.0892 | 0.9493 | 0.7965 |

TABLE I

| Model | PLCC | MAE | RMS | SRCC | KRCC |
|---|---|---|---|---|---|
| PSNR | 0.5223 | 0.8683 | 1.1435 | 0.5531 | 0.4027 |
| SSIM | 0.7732 | 0.6546 | 0.8511 | 0.7749 | 0.5768 |
| MS-SSIM | 0.8451 | 0.5578 | 0.7173 | 0.8541 | 0.6568 |
| VIF | 0.8090 | 0.5990 | 0.7888 | 0.7496 | 0.5863 |
| FSIM | 0.8738 | 0.4927 | 0.6525 | 0.8805 | 0.6946 |
| SSIMplus | 0.9422 | 0.3136 | 0.4101 | 0.8760 | 0.7037 |

TABLE J

| Model | PLCC | MAE | RMS | SRCC | KRCC |
|---|---|---|---|---|---|
| PSNR | 0.6605 | 0.6988 | 0.9308 | 0.6531 | 0.4815 |
| SSIM | 0.7895 | 0.6172 | 0.7608 | 0.7417 | 0.5588 |
| MS-SSIM | 0.8329 | 0.5425 | 0.6861 | 0.7859 | 0.6047 |
| VIF | 0.7720 | 0.6444 | 0.7880 | 0.6769 | 0.5147 |
| FSIM | 0.8589 | 0.5140 | 0.6349 | 0.8015 | 0.6289 |
| SSIMplus | 0.9095 | 0.3945 | 0.5153 | 0.9108 | 0.7363 |

Figure 10:
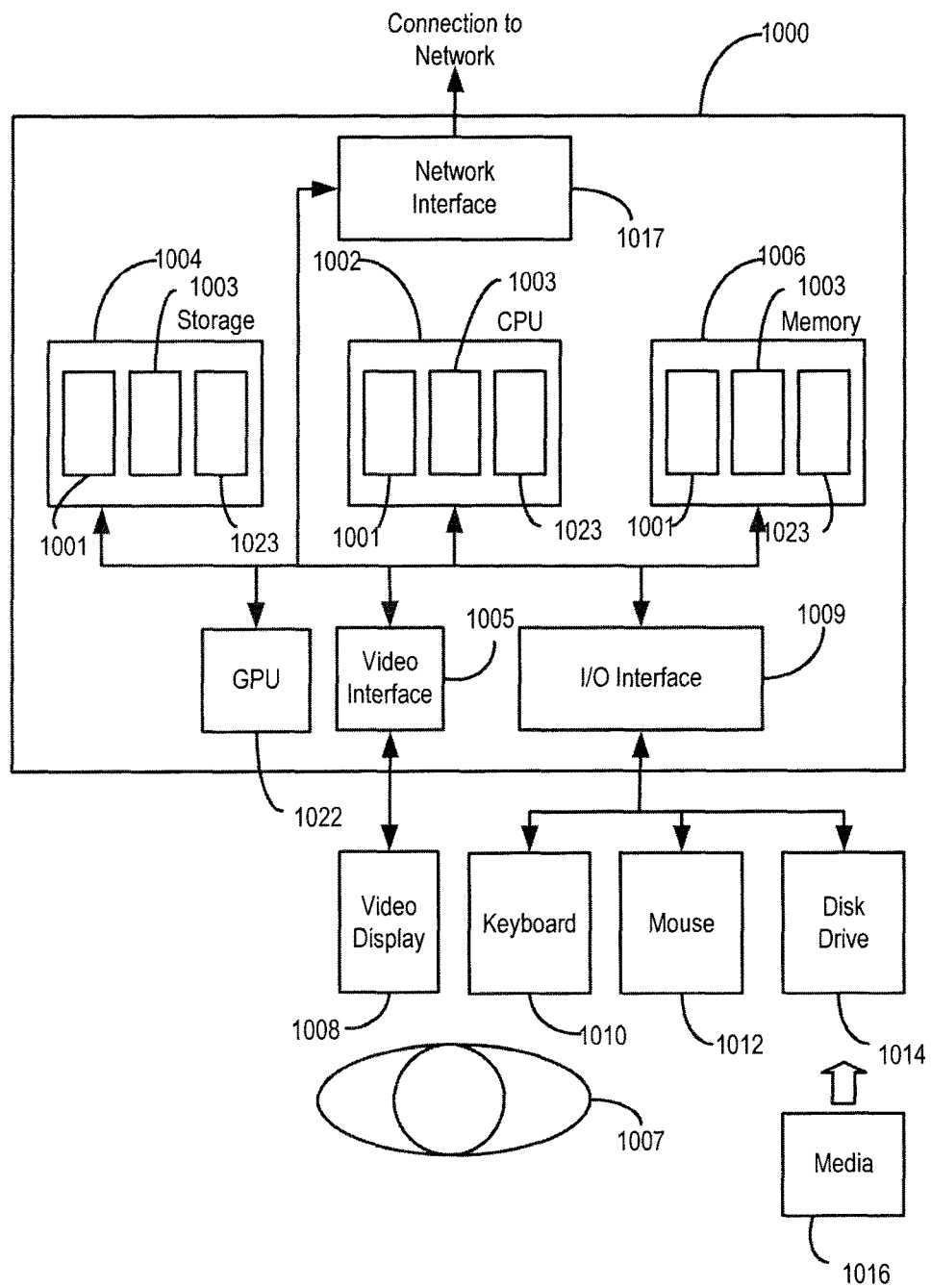
FIG. 10 shows a schematic block diagram of a generic computing device which may provide a suitable operating environment for one or more embodiments of the method and system.

Now referring to FIG. 10, shown is a schematic block diagram of a generic computing device. A suitably configured computer device, and associated communications networks, devices, software and firmware may provide a platform for enabling one or more embodiments as described above. By way of example, FIG. 10 shows a generic computer device 1000 that may include a central processing unit ("CPU") 1002 connected to a storage unit 1004 and to a random access memory 1006. The CPU 1002 may process an operating system 1001, application program 1003, and data 1023. The operating system 1001, application program 1003, and data 1023 may be stored in storage unit 1004 and loaded into memory 1006, as may be required. Computer device 1000 may further include a graphics processing unit (GPU) 1022 which is operatively connected to CPU 1002 and to memory 1006 to offload intensive image processing calculations from CPU 1002 and run these calculations in parallel with CPU 1002. An operator 10010 may interact with the computer device 1000 using a video display 1008 connected by a video interface 1005, and various input/output devices such as a keyboard 1010, pointer 1012, and storage 1014 connected by an I/O interface 1009. In known manner, the pointer 1012 may be configured to control movement of a cursor or pointer icon in the video display 1008, and to operate various graphical user interface (GUI)

controls appearing in the video display 1008. The computer device 1000 may form part of a network via a network interface 1011, allowing the computer device 1000 to communicate with other suitably configured data processing systems or circuits. One or more different types of sensors 1030 connected via a sensor interface 1032 may be used to search for and sense input from various sources. The sensors 1030 may be built directly into the generic computer device 1000, or optionally configured as an attachment or accessory to the generic computer device 1000.

Use Cases

The present system and method utilizes advanced technologies to accurately predict QoE of end consumers. The product enables automating the vital processes of precise quality check, control, assurance, and auditing of a video in real-time such as:

- Automation of real-time, accurate video QoE analysis for quality check, monitoring, assurance, auditing, and control. This has been made possible by the present system and method due the fact that it is accurate and fast, as the computational models that are used can capture the human behaviors of quality assessment in an efficient manner;
- Adaptation of the video QoE analysis process according to the properties of any display device and viewing conditions;
- Prediction of quality at the pixel level for detailed inspection of a distorted video;
- Determination & optimization of resource allocation strategies for visual communication systems based on desired video quality such as DASH, HLS, etc;
- Video quality evaluation and comparison to determine the performance of various video acquisition, processing, compression, storage, transmission, reproduction, and display methods and systems;
- Design and optimization of methods and systems in video acquisition, processing, compression, storage, transmission, reproduction, and display methods and systems. These applications of the method can be very beneficial for the content producers as well broadcasters as it can indicate the regions degraded severely. The technology has the capability to enhance the performance of video processing methods by providing qualitative and quantitative feedback to the method in terms of quality of the output video. As a result, the video processing method has a chance to tune the parameters of the video being processed.

Thus, in an aspect, there is provided a method implemented on a computing device having a processor and a memory for assessing perceptual objective video quality that predicts human visual video quality perception behaviours, comprising: producing a multi-dimensional quality map of a video being assessed, where the map indicates local quality variations of the video in a multi-dimensional space including one or more of two spatial dimensions, one scale dimension, one time dimension, and one distortion type dimension; and combining the multi-dimensional quality map into a scalar or vector-valued measure on the quality of the video being assessed.

In an embodiment, the method further comprises using device dependent and viewing condition input parameters to make any video quality assessment method adaptable to a display device and viewing conditions.

In another embodiment, the method further comprises using a computationally efficient multi-resolution image transform that decomposes a video frame into multiple scales so as to perform accurate multi-dimensional video quality assessment in the generation of the multi-dimensional quality map.

In another embodiment, the method further comprises using device and viewing condition dependent input parameters in the generation of the multi-dimensional quality map.

In another embodiment, the method further comprises using one or more of the following device and viewing condition dependent input parameters in the generation of the multi-dimensional quality map: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

In another embodiment, the method further comprises using device and viewing condition dependent input parameters in a combination of the multi-dimensional quality map or a subset of the multi-dimensional quality map into a scalar or vector-values quality measure of the video being tested.

In another embodiment, the method further comprises using one or more of the following device and viewing condition dependent input parameters in the combination of the multi-dimensional quality map or a subset of the multi-dimensional quality map into a scalar or vector-values quality measure of the video being tested: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

In another embodiment, the method further comprises determining and using spatial and/or temporal contrast sensitivity of human visual systems at spatial and/or temporal frequencies present in the video being tested, based on the device and viewing condition dependent input parameters, in generation of the multi-dimensional quality map.

In another embodiment, the method further comprises determining and using spatial and/or temporal contrast sensitivity of human visual systems at the spatial and/or temporal frequencies present in the video being tested, based on the device and viewing condition dependent input parameters, in the combination of the multi-dimensional quality map or a subset of the multi-dimensional quality map into a scalar or vector-values quality measure of the video being tested.

In another embodiment, the method further comprises determining a viewing resolution factor in the unit of pixels per degree of visual angle using the parameters or a subset of parameters of viewing window/screen size, device screen resolution, replay temporal resolution, viewing distance, device screen contrast, viewing angle, and viewing window resolution; and computing a spatial or spatiotemporal contrast sensitivity function (CSF) using the parameters or a subset of parameters of viewing window/screen size, device screen resolution, replay temporal resolution, viewing distance, device screen contrast, viewing angle, and viewing window resolution.

In another embodiment, the method further comprises determining a frequency covering range of each scale in the multi-resolution transform using the viewing resolution factor, and use the frequency covering ranges of all scales in the multi-resolution transform to divide the full CSF into multiple regions, each corresponds to one scale; computing a weighting factor of each scale either by the height of the CSF function sampled at the center (or weight center) of the frequency covering range, or by the area under the CSF function within the frequency covering range of that scale; and determining the importance of each scale using the weighting factor in the combination of the multi-dimensional quality map or a subset of the multi-dimensional quality map into a scalar or vector-values quality measure of the video being tested.

In another embodiment, the method further comprises using device and viewing condition dependent input parameters in the combination of the multi-dimensional quality map or a subset of the multi-dimensional quality map into a scalar or vector-values quality measure of the video being tested.

In another embodiment, the method further comprises reporting one or multiple layers of quality assessment evaluations based user requirement, where the layers include: a) the overall quality of the video being assessed; b) quality assessment scores based on specific distortion types, specific time instances, and/or at specific scales; and c) quality maps of particular distortion types, of specific time instances, or at specific scales.

In another embodiment, when the resolutions and/or content of the two videos do not match, the method further comprises resampling, performing a fast motion estimation, and spatially aligning the reference video to the video being tested in the generation of the multi-dimensional quality map.

In another embodiment, the method further comprises using device and viewing condition dependent input parameters in the generation of the multi-dimensional quality map.

In another embodiment, when the resolutions and/or content of the two videos do not match, in the combination of the multi-dimensional quality map or a subset of the multi-dimensional quality map into a scalar or vector-values quality measure of the video being tested, the method further comprises resampling the video being tested, performing a fast motion estimation, and spatially aligning the reference video to the video being tested.

In another aspect, there is provided a system embodied in a computing device for assessing perceptual objective video quality that predicts human visual video quality perception behaviours, the system adapted to: produce a multi-dimensional quality map of a video being assessed, where the map indicates local quality variations of the video in a multi-dimensional space including one or more of two spatial dimensions, one scale dimension, one time dimension, and one distortion type dimension; and combine the multi-dimensional quality map into a scalar or vector-valued measure on the quality of the video being assessed.

In an embodiment, the system is further adapted to use device dependent and viewing condition input parameters to make any video quality assessment method adaptable to a display device and viewing conditions.

In another embodiment, the system is further adapted to use a computationally efficient multi-resolution image transform that decomposes a video frame into multiple scales so as to perform accurate multi-dimensional video quality assessment in the generation of the multi-dimensional quality map.

In another embodiment, the system is further adapted to use device and viewing condition dependent input parameters in the generation of the multi-dimensional quality map.

In another embodiment, the system is further adapted to use one or more of the following device and viewing condition dependent input parameters in the generation of the multi-dimensional quality map: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

In another embodiment, the system is further adapted to use device and viewing condition dependent input parameters in a combination of the multi-dimensional quality map or a subset of the multi-dimensional quality map into a scalar or vector-values quality measure of the video being tested.

In another embodiment, the system is further adapted to use one or more of the following device and viewing condition dependent input parameters in the combination of the multi-dimensional quality map or a subset of the multi-dimensional quality map into a scalar or vector-values quality measure of the video being tested: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

In another embodiment, the system is further adapted to use spatial and/or temporal contrast sensitivity of human visual systems at spatial and/or temporal frequencies present in the video being tested, based on the device and viewing condition dependent input parameters, in generation of the multi-dimensional quality map.

In another embodiment, the system is further adapted to use spatial and/or temporal contrast sensitivity of human visual systems at the spatial and/or temporal frequencies present in the video being tested, based on the device and viewing condition dependent input parameters, in the combination of the multi-dimensional quality map or a subset of the multi-dimensional quality map into a scalar or vector-values quality measure of the video being tested.

In another embodiment, the system is further adapted to: determine a viewing resolution factor in the unit of pixels per degree of visual angle using the parameters or a subset of parameters of viewing window/screen size, device screen resolution, replay temporal resolution, viewing distance, device screen contrast, viewing angle, and viewing window resolution; and compute a spatial or spatiotemporal contrast sensitivity function (CSF) using the parameters or a subset of parameters of viewing window/screen size, device screen resolution, replay temporal resolution, viewing distance, device screen contrast, viewing angle, and viewing window resolution.

In another embodiment, the system is further adapted to: determine a frequency covering range of each scale in the multi-resolution transform using the viewing resolution factor, and use the frequency covering ranges of all scales in the multi-resolution transform to divide the full CSF into multiple regions, each corresponds to one scale; compute a weighting factor of each scale either by the height of the CSF function sampled at the center (or weight center) of the frequency covering range, or by the area under the CSF function within the frequency covering range of that scale;

and determine the importance of each scale using the weighting factor in the combination of the multi-dimensional quality map or a subset of the multi-dimensional quality map into a scalar or vector-values quality measure of the video being tested.

In another embodiment, the system is further adapted to use device and viewing condition dependent input parameters in the combination of the multi-dimensional quality map or a subset of the multi-dimensional quality map into a scalar or vector-values quality measure of the video being tested.

In another embodiment, the system is further adapted to report one or multiple layers of quality assessment evaluations based user requirement, where the layers include: a) the overall quality of the video being assessed; b) quality assessment scores based on specific distortion types, specific time instances, and/or at specific scales; and c) quality maps of particular distortion types, of specific time instances, or at specific scales.

In another embodiment, when the resolutions and/or content of the two videos do not match, the system is further adapted to resample, perform a fast motion estimation, and spatially align the reference video to the video being tested in the generation of the multi-dimensional quality map.

In another embodiment, the system is further adapted to use device and viewing condition dependent input parameters in the generation of the multi-dimensional quality map.

In another embodiment, when the resolutions and/or content of the two videos do not match, in the combination of the multi-dimensional quality map or a subset of the multi-dimensional quality map into a scalar or vector-values quality measure of the video being tested, the system is further adapted to resample the video being tested, perform a fast motion estimation, and spatially align the reference video to the video being tested.

REFERENCES

Relevant background prior art references include:
[1] Z. Wang and A. Bovik, "Mean squared error: love it or leave it?—a new look at signal fidelity measures," IEEE Signal Processing Magazine, vol. 26, pp. 98-117, January 2009.
[2] Z. Wang, A. C. Bovik, H. R. Sheikh, and E. P. Simoncelli, "Image quality assessment: From error visibility to structural similarity," IEEE Transactions on Image Processing, vol. 13, no. 4, pp. 600-612, April 2004.
[3] Z. Wang, L. Lu, and A. C. Bovik, "Video quality assessment based on structural distortion measurement," Signal Processing: Image Communication, vol. 19, pp. 121-132, February 2004.
[4] Z. Wang, E. P. Simoncelli, and A. C. Bovik, "Multi-scale structural similarity for image quality assessment", IEEE Asilomar Conference on Signals, Systems and Computers, November 2003.
[5] M. H. Pinson, "A new standardized method for objectively measuring video quality", IEEE Transactions on Broadcasting, vol. 50, no. 3, pp. 312-322, September 2004.
[6] K. Seshadrinathan and A. C. Bovik, "Motion tuned spatio-temporal quality assessment of natural videos", IEEE Transactions on Image Processing, vol. 19, no. 2, pp. 335-350, February 2010.
[7] Kai Zeng, Abdul Rehman, Jiheng Wang and Zhou Wang, "From H.264 to HEVC: coding gain predicted by objective video quality assessment models," International Workshop on Video Processing and Quality Metrics for Consumer Electronics, Scottsdale, Ariz., USA, January-February 2013.
[8] V. Baroncini, J. R. Ohm, and G. J. Sullivan, Report on preliminary subjective testing of HEVC compression capability. In JCT-VC of ITU-T SG16 WP3 and ISO/IEC JTC1/SC29/WG11, San Jose, Calif., February 2012.
[9] H. R. Sheikh, M. Sabir, and A. C. Bovik, "A statistical evaluation of recent full reference image quality assessment algorithms", IEEE Transactions on Image Processing, 15(11):3440-3451, November 2006.
[10] VQEG, "Final report from the video quality experts group on the validation of objective models of video quality assessment", Technical report, available at http://www.vqeg.org/, April 2000.
[11] H. R. Sheikh and A. C. Bovik, "Image information and visual quality," IEEE Trans. Image Process, vol. 15, no. 2, pp. 430-444, February 2006.
[12] Lin Zhang, Lei Zhang, Xuanqin Mou, and David Zhang, "FSIM: A Feature Similarity Index for Image Quality Assessment", IEEE Transactions on Image Processing, (20) 8:2378-2386, 2011.

What is claimed is:

1. A method implemented on a computing device having a processor and a memory for assessing perceptual objective video quality that predicts human visual video quality perception behaviors, comprising:
producing a multi-dimensional quality map of a video being assessed, where the map indicates local quality variations of the video in a multi-dimensional space including one or more of two spatial dimensions, one scale dimension, one time dimension, and one distortion type dimension;
determining a viewing resolution factor in the unit of pixels per degree of visual angle using the parameters or a subset of parameters of viewing window/screen size, device screen resolution, replay temporal resolution, viewing distance, device screen contrast, viewing angle, and viewing window resolution; and
utilizing the viewing resolution factor in the combination of the multi-dimensional quality map into a scalar or vector-valued measure on the quality of the video being assessed.

2. The method of claim 1, further comprising using device dependent and viewing condition input parameters to make any video quality assessment method adaptable to a display device and viewing conditions.

3. The method of claim 1, further comprising using a computationally efficient multi-resolution image transform that decomposes a video frame into multiple scales so as to perform accurate multi-dimensional video quality assessment in the generation of the multi-dimensional quality map.

4. The method of claim 1, further comprising using device and viewing condition dependent input parameters in the generation of the multi-dimensional quality map.

5. The method of claim 4, further comprising using one or more of the following device and viewing condition dependent input parameters in the generation of the multi-dimensional quality map: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

6. The method of claim 1, further comprising using device and viewing condition dependent input parameters in the combination of the multi-dimensional quality map or a subset of the multi-dimensional quality map into a scalar or vector-valued quality measure of the video being tested.

7. The method of claim 6, further comprising using one or more of the following device and viewing condition dependent input parameters in the combination of the multi-dimensional quality map or a subset of the multi-dimensional quality map into a scalar or vector-values quality measure of the video being tested: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

8. The method of claim 1, further comprising determining and using spatial and/or temporal contrast sensitivity of human visual systems at spatial and/or temporal frequencies present in the video being tested, based on the device and viewing condition dependent input parameters, in the generation of the multi-dimensional quality map.

9. The method of claim 1, further comprising determining and using spatial and/or temporal contrast sensitivity of human visual systems at the spatial and/or temporal frequencies present in the video being tested, based on the device and viewing condition dependent input parameters, in the combination of the multi-dimensional quality map or a subset of the multi-dimensional quality map into a scalar or vector-valued quality measure of the video being tested.

10. The method of claim 1, further comprising computing a spatial or spatiotemporal contrast sensitivity function (CSF) using the viewing resolution factor.

11. The method of claim 10, further comprising: determining a frequency covering range of each scale in the multi-resolution transform using the viewing resolution factor, and use the frequency covering ranges of all scales in the multi-resolution transform to divide the full CSF into multiple regions, each corresponds to one scale; computing a weighting factor of each scale either by the height of the CSF function sampled at the center (or weight center) of the frequency covering range, or by the area under the CSF function within the frequency covering range of that scale; and determining the importance of each scale using the weighting factor in the combination of the multi-dimensional quality map or a subset of the multi-dimensional quality map into a scalar or vector-values quality measure of the video being tested.

12. The method of claim 1, further comprising reporting one or multiple layers of quality assessment evaluations based user requirement, where the layers include: a) the overall quality of the video being assessed; b) quality assessment scores based on specific distortion types, specific time instances, and/or at specific scales; and c) quality maps of particular distortion types, of specific time instances, or at specific scales.

13. The method of claim 1, wherein, when the resolutions and/or content of the two videos do not match, the method further comprises resampling, performing a fast motion estimation, and spatially aligning the reference video to the video being tested in the generation of the multi-dimensional quality map.

14. The method of claim 13, further comprising using device and viewing condition dependent input parameters in the generation of the multi-dimensional quality map.

15. The method of claim 1, wherein, when the resolutions and/or content of the two videos do not match, in the combination of the multi-dimensional quality map or a subset of the multi-dimensional quality map into a scalar or vector-valued quality measure of the video being tested, the method further comprises resampling the video being tested, performing a fast motion estimation, and spatially aligning the reference video to the video being tested.

16. A system embodied in a computing device for assessing perceptual objective video quality that predicts human visual video quality perception behaviors, the system adapted to:
produce a multi-dimensional quality map of a video being assessed, where the map indicates local quality variations of the video in a multi-dimensional space including one or more of two spatial dimensions, one scale dimension, one time dimension, and one distortion type dimension;
determine a viewing resolution factor in the unit of pixels per degree of visual angle using the parameters or a subset of parameters of viewing window/screen size, device screen resolution, replay temporal resolution, viewing distance, device screen contrast, viewing angle, and viewing window resolution; and
utilizing the viewing resolution factor to combine the multi-dimensional quality map into a scalar or vector-valued measure on the quality of the video being assessed.

17. The system of claim 16, wherein the system is further adapted to use device dependent and viewing condition input parameters to make any video quality assessment method adaptable to a display device and viewing conditions.

18. The system of claim 16, wherein the system is further adapted to use a computationally efficient multi-resolution image transform that decomposes a video frame into multiple scales so as to perform accurate multi-dimensional video quality assessment in the generation of the multi-dimensional quality map.

19. The system of claim 16, wherein the system is further adapted to use device and viewing condition dependent input parameters in the generation of the multi-dimensional quality map.

20. The system of claim 19, wherein the system is further adapted to use one or more of the following device and viewing condition dependent input parameters in the generation of the multi-dimensional quality map: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

21. The system of claim 16, wherein the system is further adapted to use device and viewing condition dependent input parameters in the combination of the multi-dimensional quality map or a subset of the multi-dimensional quality map into a scalar or vector-valued quality measure of the video being tested.

22. The system of claim 21, wherein the system is further adapted to use one or more of the following device and viewing condition dependent input parameters in the combination of the multi-dimensional quality map or a subset of the multi-dimensional quality map into a scalar or vector-values quality measure of the video being tested: a) average or range of user viewing distance; b) sizes of viewing window and screen; c) screen resolution; d) screen contrast; e) screen brightness; f) replay temporal resolution; g) illumination condition of the viewing environment; h) viewing angle; i) viewing window resolution; j) post-filtering and image resizing methods; k) device model; l) screen gamma correction parameter; and m) option of interleave or interlaced video mode.

23. The system of claim 21, wherein when the resolutions and/or content of the two videos do not match, the system is further adapted to resample, perform a fast motion estimation, and spatially align the reference video to the video being tested in the generation of the multi-dimensional quality map.

24. The system of claim 23, wherein the system is further adapted to use device and viewing condition dependent input parameters in the generation of the multi-dimensional quality map.

25. The system of claim 16, wherein the system is further adapted to use spatial and/or temporal contrast sensitivity of human visual systems at spatial and/or temporal frequencies present in the video being tested, based on the device and viewing condition dependent input parameters, in the generation of the multi-dimensional quality map.

26. The system of claim 16, wherein the system is further adapted to use spatial and/or temporal contrast sensitivity of human visual systems at the spatial and/or temporal frequencies present in the video being tested, based on the device and viewing condition dependent input parameters, in the combination of the multi-dimensional quality map or a subset of the multi-dimensional quality map into a scalar or vector-valued quality measure of the video being tested.

27. The system of claim 26, wherein the system is further adapted to compute a spatial or spatiotemporal contrast sensitivity function (CSF) using the viewing resolution factor.

28. The system of claim 27, wherein the system is further adapted to: determine a frequency covering range of each scale in the multi-resolution transform using the viewing resolution factor, and use the frequency covering ranges of all scales in the multi-resolution transform to divide the full CSF into multiple regions, each corresponds to one scale; compute a weighting factor of each scale either by the height of the CSF function sampled at the center (or weight center) of the frequency covering range, or by the area under the CSF function within the frequency covering range of that scale; and determine the importance of each scale using the weighting factor in the combination of the multi-dimensional quality map or a subset of the multi-dimensional quality map into a scalar or vector-valued quality measure of the video being tested.

29. The system of claim 16, wherein the system is further adapted to report one or multiple layers of quality assessment evaluations based user requirement, where the layers include: a) the overall quality of the video being assessed; b) quality assessment scores based on specific distortion types, specific time instances, and/or at specific scales; and c) quality maps of particular distortion types, of specific time instances, or at specific scales.

30. The system of claim 16, wherein when the resolutions and/or content of the two videos do not match, in the combination of the multi-dimensional quality map or a subset of the multi-dimensional quality map into a scalar or vector-valued quality measure of the video being tested, the system is further adapted to resample the video being tested, perform a fast motion estimation, and spatially align the reference video to the video being tested.

31. A method implemented on a computing device having a processor and a memory for assessing perceptual objective video quality that predicts human visual video quality perception behaviors, comprising:
producing a multi-dimensional quality map of a video being assessed, where the map indicates local quality variations of the video in a multi-dimensional space including one or more of two spatial dimensions, one scale dimension, one time dimension, and one distortion type dimension;
determining a viewing resolution factor in the unit of pixels per degree of visual angle using the parameters or a subset of parameters of viewing window/screen size, device screen resolution, replay temporal resolution, viewing distance, device screen contrast, viewing angle, and viewing window resolution;
computing a spatial or spatiotemporal contrast sensitivity function (CSF) using the parameters or a subset of parameters of viewing window/screen size, device screen resolution, replay temporal resolution, viewing distance, device screen contrast, viewing angle, and viewing window resolution; and
utilizing the viewing resolution factor in the combination of the multi-dimensional quality map into a scalar or vector-valued measure on the quality of the video being assessed.

32. A system embodied in a computing device for assessing perceptual objective video quality that predicts human visual video quality perception behaviors, the system adapted to:
produce a multi-dimensional quality map of a video being assessed, where the map indicates local quality variations of the video in a multi-dimensional space including one or more of two spatial dimensions, one scale dimension, one time dimension, and one distortion type dimension;
determine a viewing resolution factor in the unit of pixels per degree of visual angle using the parameters or a subset of parameters of viewing window/screen size, device screen resolution, replay temporal resolution, viewing distance, device screen contrast, viewing angle, and viewing window resolution;
compute a spatial or spatiotemporal contrast sensitivity function (CSF) using the parameters or a subset of parameters of viewing window/screen size, device screen resolution, replay temporal resolution, viewing distance, device screen contrast, viewing angle, and viewing window resolution; and
utilizing the viewing resolution factor to combine the multi-dimensional quality map into a scalar or vector-valued measure on the quality of the video being assessed.

* * * * *